United States Patent
Benkreira et al.

(10) Patent No.: US 11,687,626 B2
(45) Date of Patent: Jun. 27, 2023

(54) SYSTEM AND METHOD FOR SECURING A BROWSER AGAINST FONT USAGE FINGERPRINTING

(71) Applicant: Capital One Services, LLC, McLean, VA (US)

(72) Inventors: Abdelkader Benkreira, Washington, DC (US); Michael Mossoba, Arlington, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 346 days.

(21) Appl. No.: 16/904,196

(22) Filed: Jun. 17, 2020

(65) Prior Publication Data

US 2021/0397679 A1    Dec. 23, 2021

(51) Int. Cl.
*G06F 3/00* (2006.01)
*G06F 21/12* (2013.01)
*G06F 16/958* (2019.01)
*G06F 40/109* (2020.01)
*G06F 21/62* (2013.01)

(52) U.S. Cl.
CPC .......... *G06F 21/128* (2013.01); *G06F 16/986* (2019.01); *G06F 21/6263* (2013.01); *G06F 40/109* (2020.01)

(58) Field of Classification Search
CPC .... G06F 21/128; G06F 16/986; G06F 40/109; G06F 21/6263
See application file for complete search history.

(56) References Cited

U.S. PATENT DOCUMENTS

| | | | |
|---|---|---|---|
| 8,132,094 B1 | 3/2012 | Bryar et al. | |
| 8,488,886 B2 | 7/2013 | Hammond | |
| 9,535,880 B2 | 1/2017 | Gupta et al. | |
| 9,836,438 B2 | 12/2017 | Sherkin | |
| 9,864,750 B2 | 1/2018 | Tecu | |
| 2004/0205601 A1* | 10/2004 | Smith | G06F 40/151 715/205 |
| 2007/0031801 A1* | 2/2007 | Tidwell-Scheuring | G09B 7/00 434/362 |

(Continued)

FOREIGN PATENT DOCUMENTS

| | | |
|---|---|---|
| CA | 2753508 A1 | 12/2011 |
| CA | 2752860 C | 1/2018 |

(Continued)

*Primary Examiner* — Kyle R Stork
(74) *Attorney, Agent, or Firm* — Hunton Andrews Kurth LLP (57) ABSTRACT

In a method for securing a web browser, display instructions for displaying web content are received from a content server by a web browser operating on a client computing device. The web browser creates a document object using the display instructions and determines from the document object whether one or more of the display instructions meet font profiling criteria selected to identify attempts to profile font display characteristics of the web browser. Responsive to a determination that font profiling criteria are met, the web browser alters a character display of the document object and implements the document object for displaying the web content on the client computing device.

20 Claims, 9 Drawing Sheets

(56) References Cited

U.S. PATENT DOCUMENTS

| | | |
|---|---|---|
| 2007/0139412 A1* | 6/2007 | Stamm .................. G06T 11/203 |
| | | 345/467 |
| 2008/0303822 A1 | 12/2008 | Taylor et al. |
| 2011/0170144 A1 | 7/2011 | Sankarasubramaniam et al. |
| 2011/0289407 A1* | 11/2011 | Naik ..................... G06F 40/109 |
| | | 715/269 |
| 2012/0030576 A1 | 2/2012 | Bell et al. |
| 2012/0072824 A1 | 3/2012 | Sherkin et al. |
| 2012/0072825 A1 | 3/2012 | Sherkin et al. |
| 2013/0124983 A1 | 5/2013 | Hausig |
| 2013/0125038 A1 | 5/2013 | Horns |
| 2015/0169521 A1 | 6/2015 | Leventhal et al. |
| 2015/0199314 A1 | 7/2015 | Ratnakar |
| 2015/0324341 A1 | 11/2015 | Bhagwan et al. |
| 2016/0314377 A1 | 10/2016 | Vieira et al. |
| 2016/0335366 A1* | 11/2016 | Zhang .................... G06F 16/23 |
| 2016/0371232 A1* | 12/2016 | Ellis ...................... G06F 40/109 |
| 2017/0061228 A1 | 3/2017 | Maltun et al. |
| 2017/0344519 A1* | 11/2017 | Scott ..................... G06F 40/109 |
| 2018/0330156 A1* | 11/2018 | Rakita .................. G06V 30/414 |
| 2019/0377877 A1 | 12/2019 | Johns |

FOREIGN PATENT DOCUMENTS

| | | |
|---|---|---|
| EP | 2587388 A1 | 5/2013 |
| EP | 2635976 A1 | 9/2013 |
| EP | 3097496 A1 | 11/2016 |
| GB | 2513525 A | 11/2014 |
| WO | 2020009709 A1 | 1/2020 |

* cited by examiner

SYSTEM AND METHOD FOR SECURING A BROWSER AGAINST FONT USAGE FINGERPRINTING

FIELD OF THE INVENTION

This disclosure relates generally to systems and methods for maintaining the privacy of user processing devices, and more particularly, to a method and system for reducing the ability of content providers to track a user device based on unique display rendering characteristics of the device.

BACKGROUND OF THE INVENTION

It is well known that web content providers may use browser and system operating characteristics of a particular client device to track browser usage over time. This may allow such providers to identify individual users and track their online behavior. Browser characteristics such as the number and configuration of plug-ins provide a unique "fingerprint" that allows a user to be identified and targeted. While certain security tools have been developed to counter some aspects of browser fingerprinting, certain specific variations have not been addressed.

SUMMARY OF THE INVENTION

An illustrative aspect of the invention provides a system for securing a web browser. The system comprises a client computing device comprising a data processor, a data storage module, and a display. The data processor is programmed to perform operations that comprise receiving, from a content server by a web browser operating on the client computing device, a set of display instructions to display web content on the display of the client computing device. The operations further comprise creating a display object using the set of display instructions and reviewing the display object by the web browser to determine whether one or more instructions of the set of display instructions meet font profiling criteria. Responsive to a determination that font profiling criteria are met, the web browser alters the display object to change a display of one or more font characters requested in the display instructions. The operations still further comprise executing the altered display object.

Another aspect of the invention provides a method for securing a web browser. The method comprises receiving display instructions for displaying web content from a content server by a web browser operating on a client computing device. The method further comprises creating, by the web browser, a document object using the display instructions and determining, by the web browser from the document object, whether one or more of the display instructions meet font profiling criteria selected to identify attempts to profile font display characteristics of the web browser. The method still further comprises, responsive to a determination that font profiling criteria are met, altering, by the web browser, a character display of the document object; and implementing the document object for displaying the web content on the client computing device.

Another aspect of the invention provides an automated system for monitoring web-based display operations. The system comprises a font usage aggregation server comprising a server data processing system and a font profiling data storage module. The server data processing system is configured for communication over a network and is programmed to perform operations comprising receiving font usage data from a plurality of client computing devices via a network. The font usage data includes text display information for each of a plurality of network-based display interactions. The text display information identifies for each transaction a content server and one or more character fonts specified by the content server for use in displaying web content. The server data processing system operations further comprise processing the font usage data to obtain usage statistics for identified fonts and content servers and storing the processed font usage data in a structured database in the font profiling data storage module. The operations still further comprise receiving, from a requesting computing device via the network, a request for font profiling information for at least one of the set consisting of a specified font and a specified content server, obtaining the requested font profiling information from the structured database, and transmitting the requested font-profiling information to the requesting computing device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention is directed toward countering a particular variation of browser tracking referred to as "font fingerprinting". In its simplest form, font fingerprinting may involve identifying the list of fonts available for use by a browser operating on a client system. This is similar to the identification of available plug-ins. A more sophisticated approach is based on the fact that different browser/system combinations produce unique variations in how characters are rendered for display. In this approach, website coding may include a fingerprinting script that calls for a particular character or characters to be rendered for display by the client system. The location of points on or character portions of the rendered text are identified so as to measure the unique dimensions of the text characters. This information can then be compared to previously obtained fingerprints obtained by the website provider. If the information matches a previous fingerprint, the provider can target information or actions toward the user based on previous browsing history associated with the fingerprint.

A key aspect of the above font fingerprinting approach is that the script may call for the test character(s) to be rendered as hidden text so that the user of the system is unaware of its presence. While such hidden text is entirely invisible to the user, its size and position attributes can still be measured and returned to the content provider. Because of this feature, the character(s) can be made very large to enhance the accuracy of the measurements. Another key aspect is that the font used to render the test character(s) must be the same as that used to establish the browser's fingerprint.

Embodiments of the present invention provide a system and method for identifying and countering attempts to obtain a font fingerprint of client system browser. These embodiments may be best understood with reference to FIG. 1, which illustrates an exemplary information distribution system 100 that encompasses multiple network-enabled user devices 110A, 110B, 110C, 110D and network-enabled content servers 120A, 120B, 120C in selective communication via a communication network 130. The system also encompasses a network-enabled font usage aggregation server 140 configured for communication with the user devices 110 via the communication network 130 or a different network.

Figure 1:
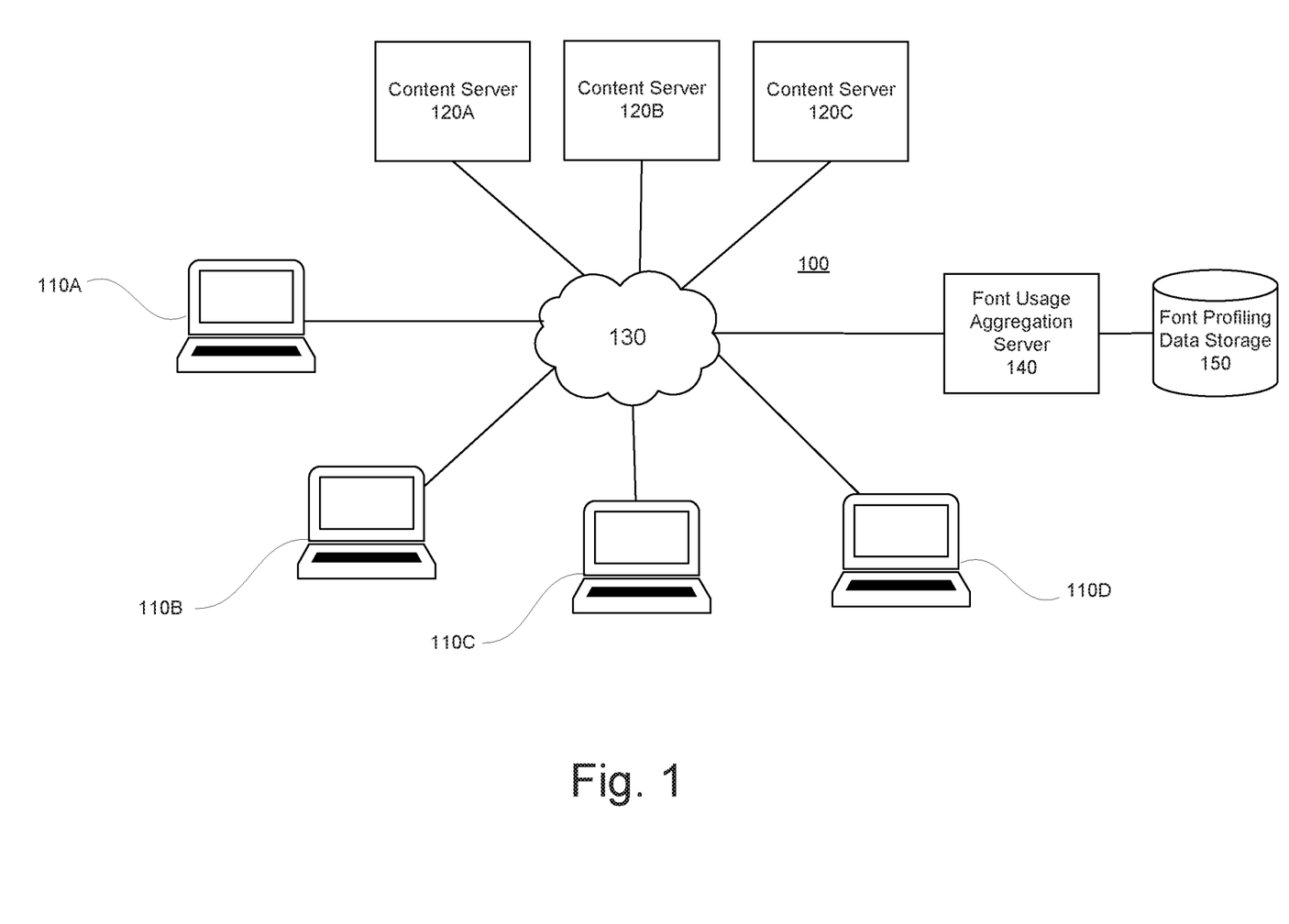
FIG. 1 is a representation of an information distribution system usable in conjunction with embodiments of the invention.

As referred to herein, a network-enabled computer system, server or device may include, without limitation, any computer device, or communications device including, a server, a network appliance, a personal computer (PC), a workstation, and a mobile processing device such as a smart phone, smart pad, handheld PC, or personal digital assistant (PDA). The network-enabled computer systems used to carry out the methods contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the transaction entities and the card processing system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In typical information transfer scenarios carried out on the system 100, a particular client device 110A uses a network address to request information from a particular content provider server 120A. Typically, this is simply a user using a client-installed browser on the device 110A to navigate to a webpage managed by the content provider 120A. The content provider 120A transmits a script to the client device 110A, which the browser executes to display the webpage content. The script may also include instructions to render hidden text.

Use of hidden text is not, of itself, an indication that a content provider is attempting to obtain a font fingerprint. Some websites, for example, may have certain text initially rendered as hidden that, upon certain actions by the user, is rendered visible. Nevertheless, inclusion of hidden text instructions, is a potential indicator that the provider is attempting to fingerprint the user's browser/system's font rendering characteristics. This becomes a stronger indicator if the website never makes the hidden text visible. Another indicator may be a request for a list of all the fonts available to the browser, particularly if the site then doesn't use any but the most common fonts.

In embodiments of the invention, the browser operating on a client system 110 may be provided with an extension that monitors display instructions in the object created to carry out the script received from the content provider. This extension may be configured to identify instructions that may be indicative of a fingerprinting attempt. This may include, for example, instructions to render hidden text, provide a list of available fonts, instructions to use a large number of different fonts, or other instructions deemed indicative of fingerprinting behavior. It will be understood, however, that any one of these behaviors, by itself, may not be a smoking gun, the instructions, collectively, may be a strong indication. For example, hidden text alone may not be a strong indicator, but hidden text that consists of a single character rendered in a very large font size may be deemed to meet the criteria for establishing fingerprinting behavior. It will also be understood that a single instance of a behavior might be acceptable, but repetition of the same behavior may be suspect. For example, a particular webpage visit in which hidden text is not made visible may not meet criteria for establishing a fingerprinting attempt. If repeated visits produce the same behavior, however, a stronger case may be made.

Accordingly, the browser extension may maintain a set of font profiling criteria that can be used to assess display instructions. It may also be provided with alternative actions depending on whether various instructions meet the criteria. These instructions may be selected so as to thwart attempts to profile the browser's font usage or display characteristics, ideally without undue impact on the display of information to the user. For example, in response to identification of an instruction to render hidden text, the browser may cause the characteristics of the hidden text (e.g., its font, size, or both) to be changed. In certain embodiments, the browser extension may be configured to reverse such changes upon encountering an instruction to render such text visible.

The browser extension may also be made capable of tracking behavior across multiple browsing sessions. As a result, the browser may be able to identify repeated behaviors and assess them against the font profiling criteria. The browser extension may also be configured to make periodic or sporadic changes to the fonts available for use in rendering content for display. This may make it more difficult for a content provider to profile the browser.

The browser extension may use predetermined font profiling criteria that may be modified over time. As discussed above, it may also be configured to monitor content provider behavior across multiple browsing sessions. It can be seen, however, that it may be useful for the browser extension to have access to information on content provider behavior across multiple client systems. Returning now to FIG. 1, the role of the font usage aggregation server 140 is to obtain and compile font usage data from the various client devices 110 having browsers with a font fingerprinting security extension of the invention. The server 140 can then aggregate and process this data and send usage information back to the client devices 110. The data provided by the client devices 110 may include statistics on text renderings for some or all webpage visits made by the extended browser. These statistics could include such parameters as the number of times a particular font is used and at which network address or for which content provider. The data could further include size and font information for characters rendered in hidden text each visited website and whether such characters were subsequently rendered visible. The data could also include information on font availability or usage information requested by content providers.

As will be discussed in more detail hereafter, the font usage aggregation server 140 may process the font usage data to produce profiling information that can be used by client device browsers to assess and/or modify text rendering instructions received from the content servers 120. Font profiling information may include, but is not limited to, information usable to establish or modify the font profiling criteria used by the browser extension, information usable by the browser extension to determine changes to font characteristics used to render hidden text, and information usable by the browser extension to change the line-up of fonts available to the browser. One example of information usable for altering the profiling criteria would be identification of particular network addresses or content providers that have exhibited known or suspected fingerprinting behavior across multiple client devices. An example of information usable to determine font changes might be statistics on the frequency of usage of various fonts across all users. These statistics could be used to identify particular fonts that can be swapped out for other fonts to change the availability line-up for the browser.

Figure 2:
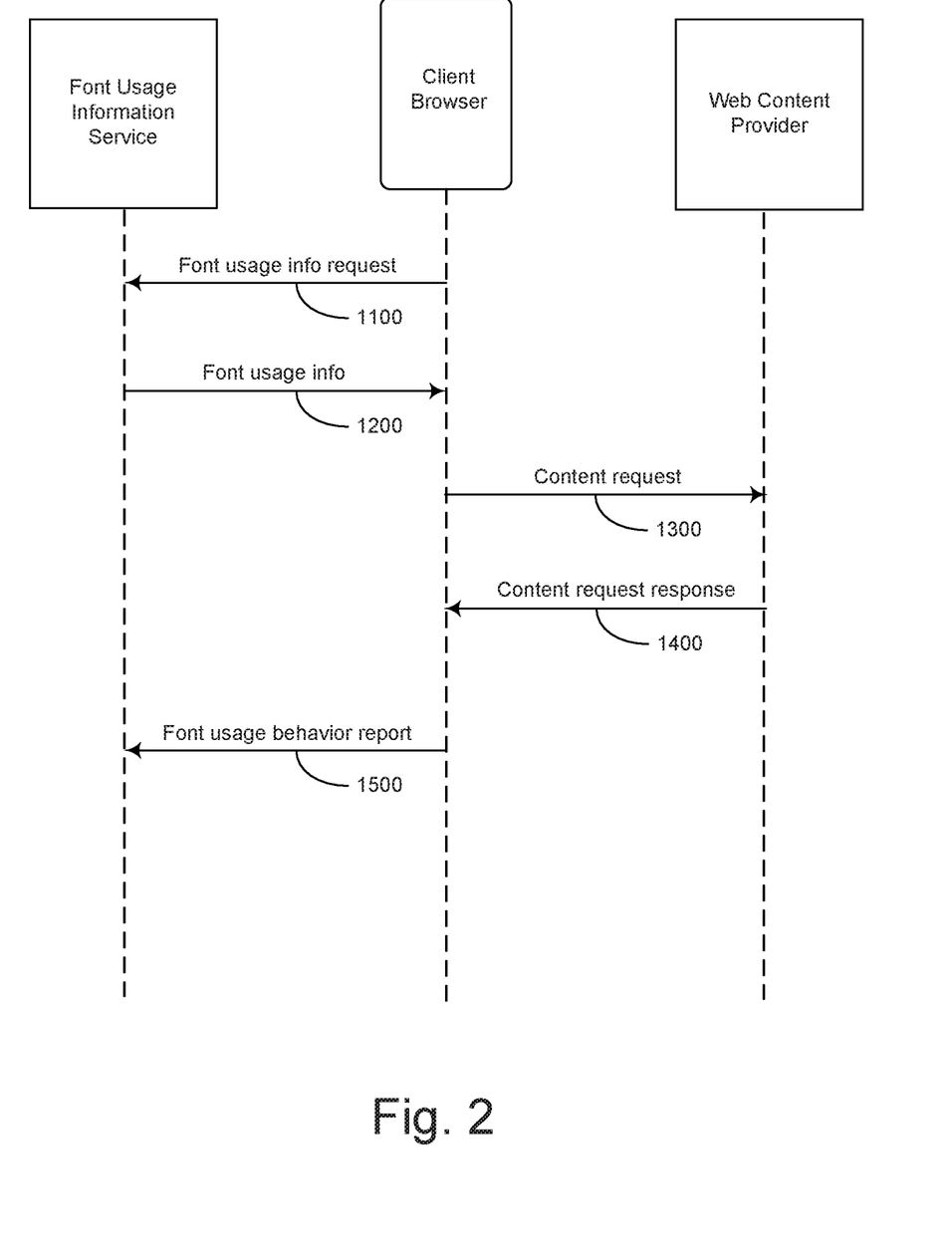
FIG. 2 illustrates a sequence of operations for monitoring information transmission and display according to an embodiment of the invention.

The sequence diagram of FIG. 2 illustrates an exemplary application of embodiments of the invention in conjunction with the system 100 of FIG. 1. In the scenario set forth in FIG. 2, a client browser resident on a client device (e.g., user device 110A) navigates to a webpage managed by a web content provider (e.g., via content server 120A). At some time prior to this action, however, the client browser may transmit a request for font usage information 1100 to a font usage information service (e.g., via the font usage aggregation server 140). The font usage information service may then transmit a request response 1200 including font usage information that the client browser can use in assessing and or acting upon display instructions received from content providers, generally, and/or certain content providers in particular. The client browser then, as part of a browsing session, transmits a content request 1300 to a web content provider. In turn, the content provider sends a response 1400 comprising an information display script, which the browser establishes as a content display object. The browser may then, through the use of a font fingerprinting security extension, assess and, if warranted, modify the display instructions in the content display object and execute the instructions of the display object. Upon or after navigating away from the website or after the end of the browsing session, the extended browser may transmit a font usage behavior report 1500 to the font usage information service. This report may include information on the specific font display requests and/or other font usage behavior occurring during site visit or the browsing session.

Details of system components usable in embodiments of the invention and, in particular, in the system 100 will now be described.

Figure 3:
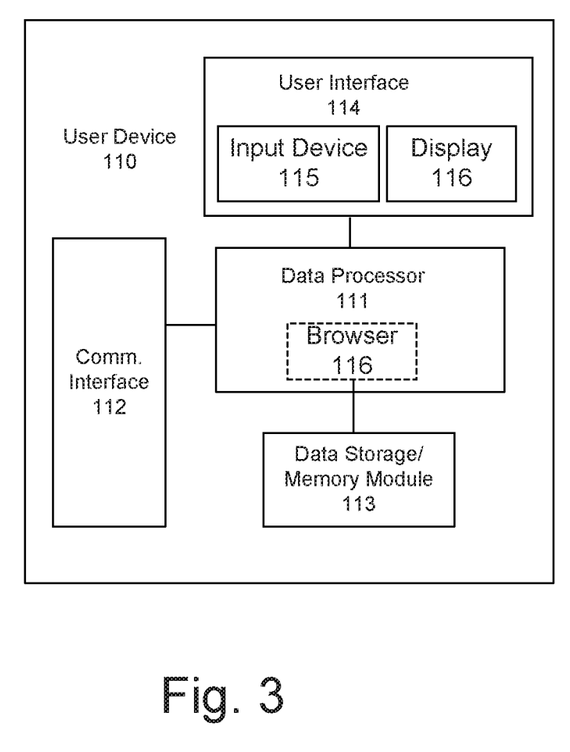
FIG. 3 is a schematic representation of a user processing device usable in accordance with embodiments of the invention.

With reference to FIG. 3, the user device 110 may be any network-enabled computer device or communications device including a server, a network appliance, a personal computer (PC), a workstation, and a mobile interface device such as a smart phone, smart pad, handheld PC, or personal digital assistant (PDA). In the particular embodiment illustrated in FIG. 3, the user device 110 includes an on-board data processor 111 in communication with a data storage/memory module 113, a user interface 114, and a communication interface 112. The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input device 115, which can be any device for entering information and instructions into the user device 110, such as a touch-screen, keyboard, mouse, cursor-control device, microphone, stylus, or digital camera. The user interface 114 may also include a display 116, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired and/or wireless data communication capability for connecting the device 110 to the network 130 or other communication network. The communication interface 112 can also be configured to support communication with a short-range wireless communication interface, such as near field communication, radio-frequency identification, and Bluetooth.

In embodiments of the invention, the data storage/memory module 113 may have stored therein one or more programmed applications usable by the data processor 111 to conduct and/or monitor interactions between the user device 110 and the content servers 120 and/or data processing systems over the network 130. The data storage/memory module 113 may, in particular, include a programmed application for implementing a network content browser 116 in the data processor 111. In particular embodiments, the data storage/memory module 113 may have stored therein instructions for implementing a font fingerprint security browser extension. These instructions may include direction for the data processor 111 to receive via the network 130 a set of display instructions from a content server 120 and determine whether one or more of the received instructions meet font profiling criteria. If any of the display instructions meet such criteria, the application may cause the data processor 111 to take one or more actions configured to mitigate the risk of font profiling or fingerprinting. This may include, for example, altering the instruction(s) to change the content or format of a text display. The data processor 111 may then be instructed to execute the altered set of display instructions, which includes rendering text for display.

The font profiling criteria may be stored in the data storage/memory module 113. In some embodiments, these criteria may be preset by the browser extension provider or the user. In some embodiments, the browser extension may be configured to modify the font profiling criteria based on font usage data gathered during some or all browsing sessions. In some embodiments, the browser extension may be configured to establish or modify the font profiling criteria based on font usage information assembled from usage data provided by multiple user devices 110. In particular embodiments, this information may be received from a font usage data aggregation server 140. The information may be so received on a periodic basis or whenever deemed appropriate by the aggregation server 140. Alternatively, the browser extension may be configured to periodically or upon demand instruct the data processor 111 to transmit a request for font usage information to the aggregation server 140.

The font fingerprint security browser extension may also include instructions for the data processor 111 to record information on font characteristics and usage for each web address or content provider from which text display instructions are received. This information may be stored in the data storage/memory module 113. In addition or instead, the information may be transmitted to the font usage aggregation server 140.

The font fingerprint security browser extension may also include instructions to periodically or randomly make changes to the browser's roster of available fonts. In some embodiments, this may include assembling a list of all available fonts and randomly deleting one or more of them. In preferred instances, a new font would be obtained to replace each deleted one. In some embodiments, the new font would be selected at random from the universe of fonts available to the client device 110. In other embodiments, the new font may be selected from a group of fonts that have relatively high usage statistics across multiple user systems. In this way, the available font list may be made less unique, thus making it more difficult to profile the browser. In some embodiments, the application instructions could include determining usage frequency for each font. In some of these embodiments, fonts that go unused for a preset amount of time would be deleted. In others, fonts may be deleted if their usage frequency drops below a threshold level. In still others, the list may be prioritized based on frequency of use and one or more of the lesser used (e.g., the bottom ten) could be selected for deletion or replacement. In other embodiments, the available font list may be prioritized based on usage information for multiple user devices 110, such data being obtained from the font usage aggregation server 140.

The content servers 120 shown in FIG. 1 are each a system of one or more network-enabled data processing systems associated with a network content provider and configured for executing one or more web server routines for transmitting content and perform operations in response to content request messages from client devices 110.

Figure 4:
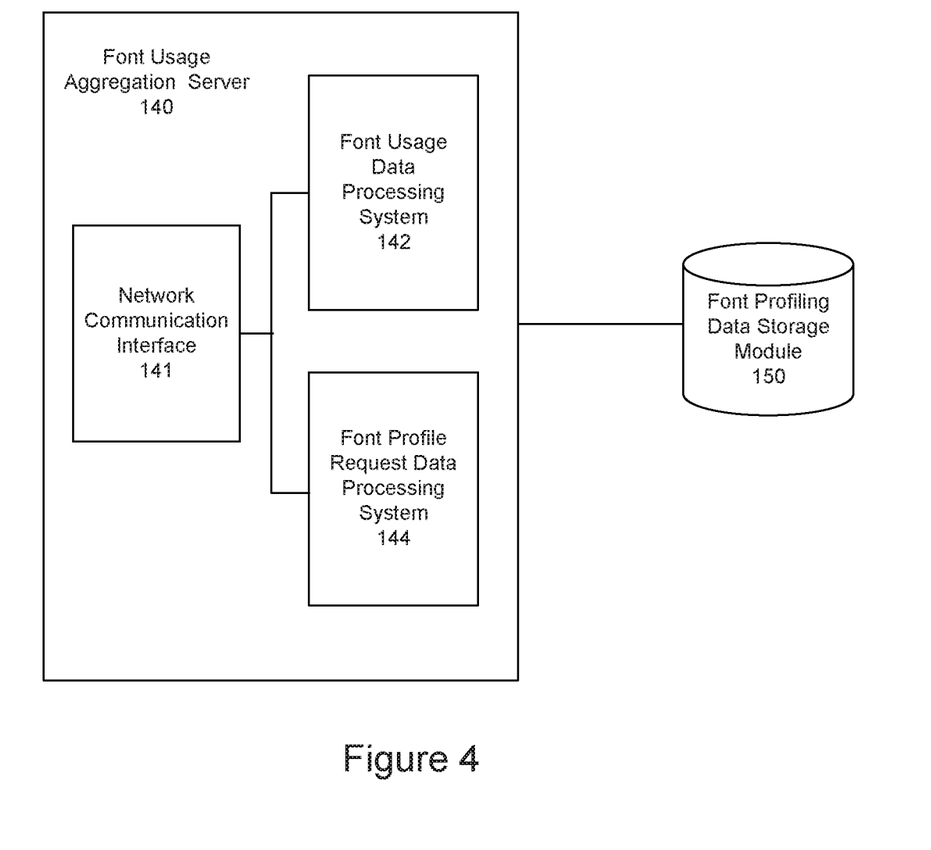
FIG. 4 is a schematic representation of a font usage aggregation server according to an embodiment of the invention.

With reference to FIG. 4, the font usage aggregation server 140 may comprise a font usage data processing system 142 and a font profile request data processing system 144, each of which is a network-enabled processing system capable of communication over the network 130 via the network communication interface 141. The font usage data processing system 142 is configured to communicate with some or all of the client computing devices 110 via the network and to receive font usage data from these devices 110. This font usage data received from a client device 110 may include information gleaned from individual interactions between the client device 110 and a single content server 120, statistical information gleaned from multiple interactions with a single content server, or statistical information gleaned from interactions with multiple content servers. In all these cases, the data may include information on display instructions transmitted to the client device 110 by the content server or servers 120. For individual interactions, the information may include identification of the content server 120, its associated content provider, or a network address. The information may also include identification of one or more character display fonts requested by the content server 120 during the interaction. The information may also include identification of specific actions requested by the content server 120. This could include, for example, a request to render hidden text along with an indication as to whether such text was ever rendered visible during the interaction. In another example, the information could include an indication that the content server 120 requested a list of available fonts, but never used any but the most common fonts. In embodiments where the font usage data is provided for multiple interactions or for interactions with multiple content servers 120, the data may include statistical information such as the frequency of use of all fonts used to render text for display or the frequency with which a particular server 120 or all servers 120 render hidden text.

The font usage data processing system 142 may be further configured to aggregate and process font usage data to obtain usage statistics across all client devices 110 providing data. The raw and/or processed font usage data may be stored in a font profiling data storage module 150. In particular embodiments, the data may be stored in a structured database configured for easy retrieval for further processing or transmission to users. The aggregated/processed data allows the establishment of behavior trends for a particular content provider or across multiple content providers.

Aggregated font usage data may, in particular, allow the identification of behavior trends that may be tied to the likelihood that a content provider is attempting to profile font usage or fingerprint font characteristics of individual browsers. The font profile request data processing system 144 is configured to provide client systems with font usage profile information drawn from the data. In some embodiments, the font profile request data processing system 144 is configured to receive a request for font profiling information from a client device. The request may specify overall font usage statistics (e.g., frequency of use for one, some or all fonts) or it may specify font usage statistics and/or other information for a particular content server. In response, the font profile request data processing system 144 may obtain the requested information from the data storage module 150 and transmit it to the requesting client device 110. In certain embodiments, the font profile request data processing system 144 may be configured to further process or format the data to match the specific information requested.

In some embodiments, the font profile request data processing system 144 may be configured to periodically transmit font usage profile information to one or more client devices 110 without receiving requests. This may particularly be the case in embodiments where the usage profile information is primarily or exclusively statistical information for multiple content providers. In such embodiments, the information may be provided as a periodic update on, for example, font usage frequency.

Figure 5:
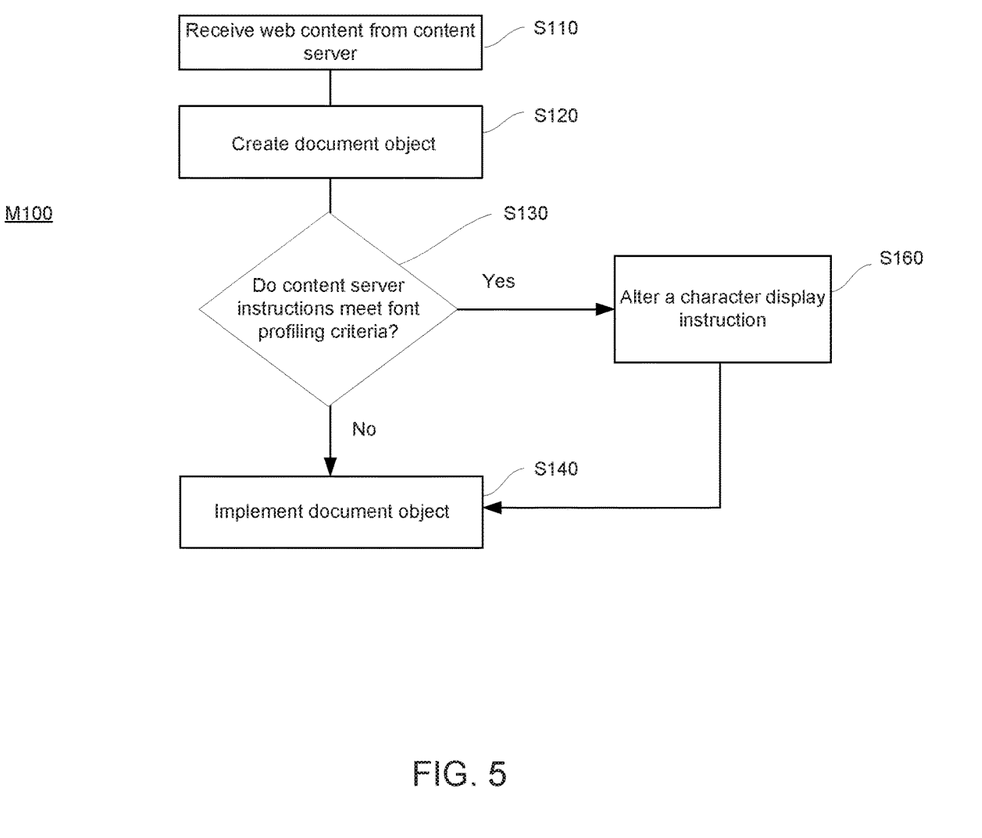
FIG. 5 is a flow diagram illustrating a method for securing a web browser according to an embodiment of the invention.

FIG. 5 illustrates an exemplary method M100 of securing a web browser from attempts to fingerprint or profile font usage or rendering characteristics. At S110, web content is received by a client device over the internet or other network from a content server. As has previously been described, the web content may be provided in the form of a script for a browser to use to display the content on the client device. At S120, the browser of the client device creates a document object for the content script. At S130, the browser reviews the document object to determine whether any of the content server instructions meet font profiling criteria. Font profiling criteria may be pre-established and stored in a memory of the client device. It may include identification of specific instructions indicative or font fingerprinting or profiling behavior (e.g., instructions to render hidden text or a request to provide a list of available fonts). In some embodiments, it may include a limit on the number of times a particular instruction may be carried out. In some embodiments, it may include a predetermined limit on the number of different fonts that may be used. In some embodiments, multiple criteria must be met. For example, the mere rendering of hidden text may not meet the profiling criteria, but rendering of hidden text using a particular font and/or a font size exceeding a size limit does meet the criteria.

If any of the content server instructions used in the creation of the document object meet the font profiling criteria, at least one character display instruction is altered or replaced at S160. This alteration may include changing the font, size, or other display characteristic of one or more characters to be rendered upon implementing the display object. The alteration could be, for example, changing the font from the requested font to a particular font (e.g., more common one) or to a randomly selected font. In some cases, the alteration could instead or in addition, be to replace one or more of the characters with different characters. In some embodiments, the action taken to alter the display characteristic may depend on the particular profiling criteria met by the display instruction. For example, if an instruction met profiling criteria because it requested rendering of a hidden character using a rarely used font and a very large font size, the alteration action could be to change the font to a commonly used font and to drastically reduce the size. The effect would be to render the character in a font not expected by the content provider and at a size that may make it far more difficult to determine relative display point geometry. In another example, if the number of fonts used exceeds a preset limit, the action could be to change one or more of the requested fonts to an already used font.

At S140, the document object is implemented to display the content provided by the web content server. If none of the display instructions met font profiling criteria, the document object is implemented unaltered and all text rendered according to the content provider's intent. If one or more instructions met the font profiling criteria, the object is implemented with the altered display instructions, thereby reducing the likelihood that the content provider will be able to profile or fingerprint the browser based on its font usage or display characteristics.

Figure 6:
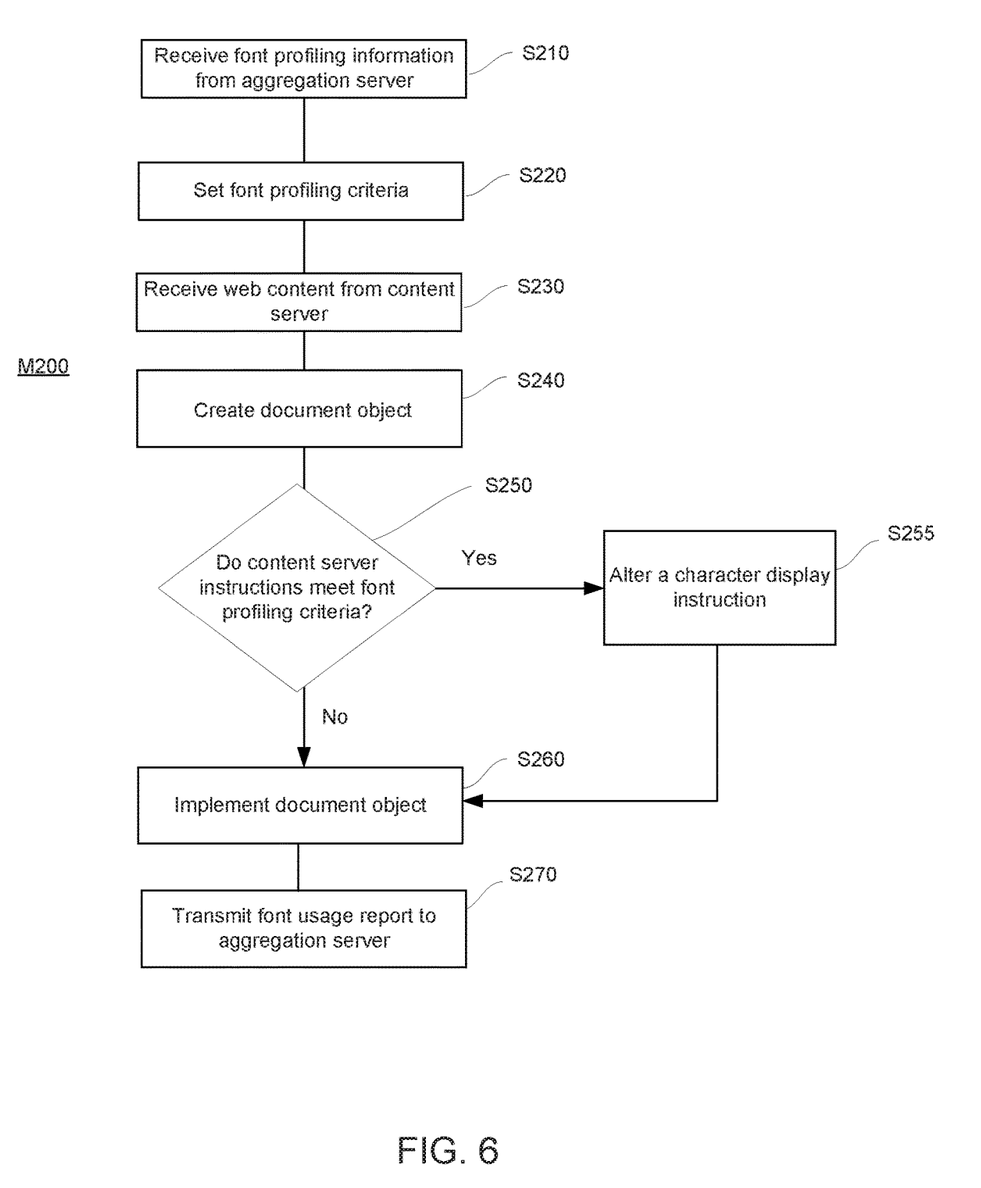
FIG. 6 is a flow diagram illustrating a method for securing a web browser according to an embodiment of the invention.

FIG. 6 illustrates another exemplary method M200 of securing a web browser from attempts to fingerprint or profile font usage or rendering characteristics. In this method, the client device obtains font usage information from a font usage data aggregation provider and uses it to establish criteria for changing display instructions. At S210 of the method M200, the data processor of the client device receives font profiling information from an aggregation server of the font usage aggregation provider. As has previously been discussed, this information may be or include statistical information usable by the client device to establish font profiling criteria and/or actions to be taken in response to identification of potential font fingerprinting behavior. At S220, the client device data processor may establish or revise font profiling criteria based on the font profiling information received from the aggregation server. In some embodiments, the client device may, in addition or instead, make changes to the actions to be taken when profiling criteria are met.

Subsequent steps of the method M200 are similar to those of the previous method M100. At S230, web content is received by a client device over the internet or other network from a content server. At S240, the browser of the client device creates a document object for the content script. At S250, the browser reviews the document object to determine whether any of the content server instructions meet font profiling criteria. If one or more of the content server instructions meet the font profiling criteria, at least one character display instruction is altered or replaced at S255. At S260, the document object is implemented to display the content provided by the web content server.

The method M200 may also include the action S270 of transmitting a report to the aggregation server about the interaction with the content server. In some embodiments, such a report may be made after each interaction or upon the completion of a browsing session. In other embodiments, the transmission of the report may be conditioned on whether any display instructions met font profiling criteria. In still other embodiments, the report may be made on a periodic basis to report usage statistics across multiple browsing sessions.

The font usage report may include font usage data from the interaction between the client device and one or more content servers, statistical information gleaned from multiple interactions with a single content server, or statistical information gleaned from interactions with multiple content servers. In all these cases, the data may include information on display instructions transmitted to the client device by the content server or servers. For individual interactions, the information may include identification of the content server, its associated content provider, or a network address. The information may also include identification of one or more character display fonts requested by the content server during the interaction. The information may also include identification of specific actions requested by the content server. In embodiments where the font usage data is provided for multiple interactions or for interactions with multiple content servers, the data may include statistical information such as the frequency of use of all fonts used to render text for display or the frequency with which a particular server or all servers render hidden text.

Figure 7:
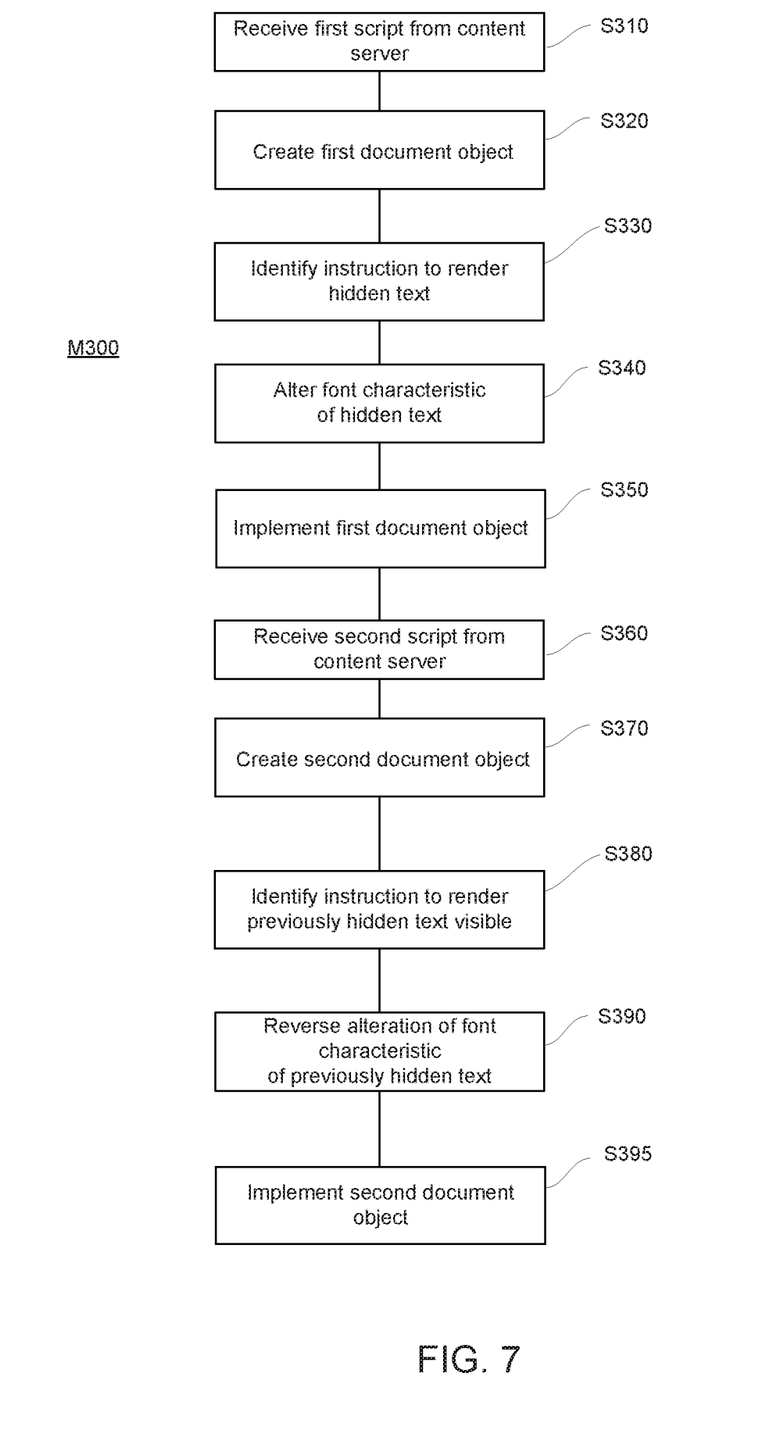
FIG. 7 is a flow diagram illustrating a method for securing a web browser according to an embodiment of the invention.

As has been discussed, many instances font fingerprinting are based on the use of hidden text rendering. Various embodiments of the invention provide methods that identify hidden text and alter it so that one or more characters are rendered in a manner that makes it more difficult for the content provider to obtain the measurements of the rendered character(s) needed to fingerprint or otherwise profile the browser. In some cases, however, subsequent instructions from the content server may change the hidden text to visible text. In such cases, it may be desirable to reverse any alterations made to such characters. FIG. 7 illustrates an exemplary method M300 in which hidden text alterations may be reversed. At S310 of the method M300, a first web content script is received by a client device over the internet or other network from a content server. At S320, the browser of the client device creates a first document object for the content script. At S330, the browser reviews the document object and identifies an instruction to render hidden script. At S340, the browser creates a new instruction in which one or more characteristics of some or all of the hidden text characters are changed. As before, this could include changing the character font, the font size, or both. In some cases, it could instead or in addition, change one or more of the characters. At S350, the first document object is implemented, thereby causing the rendering of the hidden text in its altered format. At S360, a second script is received from the content server and at S370, a second document object is created. At S380, the browser identifies from the second document object an instruction to render the previously hidden text visible. In response, the browser reverses the previously made change so that the hidden text is rendered using the font characteristics originally requested by the content server. The second document object is implemented at S395, thereby visibly displaying the previously hidden text.

It will be understood that in some cases, an instruction to render hidden text and a subsequent instruction to render such text visible may be encountered in a single script. In such cases, the browser alteration and reversal may be accomplished within the same document object. In some cases, the alteration may simply be made conditional on the rendered text remaining hidden.

Figure 8:
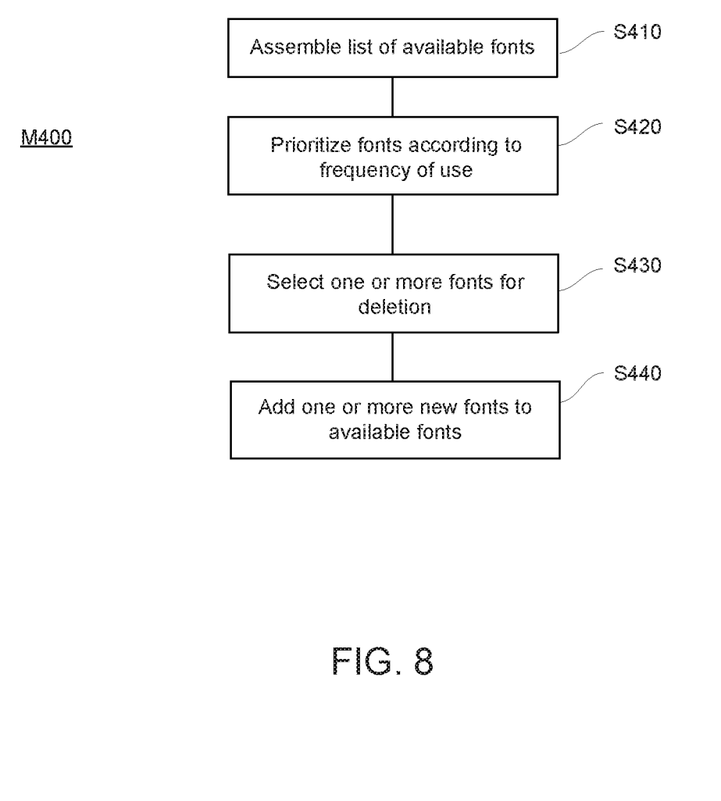
FIG. 8 is a flow diagram illustrating a method for securing a web browser according to an embodiment of the invention.

As has been discussed, content providers may attempt to establish a profile of a browser at least in part based on its available fonts. It may therefore be advantageous to periodically or sporadically alter the roster of available fonts. FIG. 8 illustrates a method of securing a browser that automatically makes such alterations. At S410 of the method M400, the browser assembles a list of fonts available to the browser for displaying text. At S420, the browser prioritizes the list of fonts. This prioritization will typically be based on frequency of use, but other criteria may also be used. In some embodiments, user preferences may be incorporated into the prioritization step. In some embodiments, usage frequency may be based solely on usage by the browser itself. In other embodiments, however, usage frequency may be based on usage data aggregated from browsers on multiple client devices. This data may have been received from an aggregation server as part of a regular periodic service or in response to a request by the browser.

At S430, one or more of the available fonts is selected for deletion. In some embodiments, this may be done completely at random. It will be understood that in such embodiments, the action of prioritizing the available fonts can be skipped. In other embodiments, one or fonts may be selected at the end of the prioritized list or randomly selected from a range at the bottom of the list. At S440, the browser may add one or more new fonts to the available font list. The font(s) to be added may be selected at random from the universe of available fonts. Alternatively, new fonts may be selected from a group of fonts that have relatively high usage statistics across multiple user systems. In this way, the available font list may be made less unique, thus making it more difficult to profile the browser.

Figure 9:
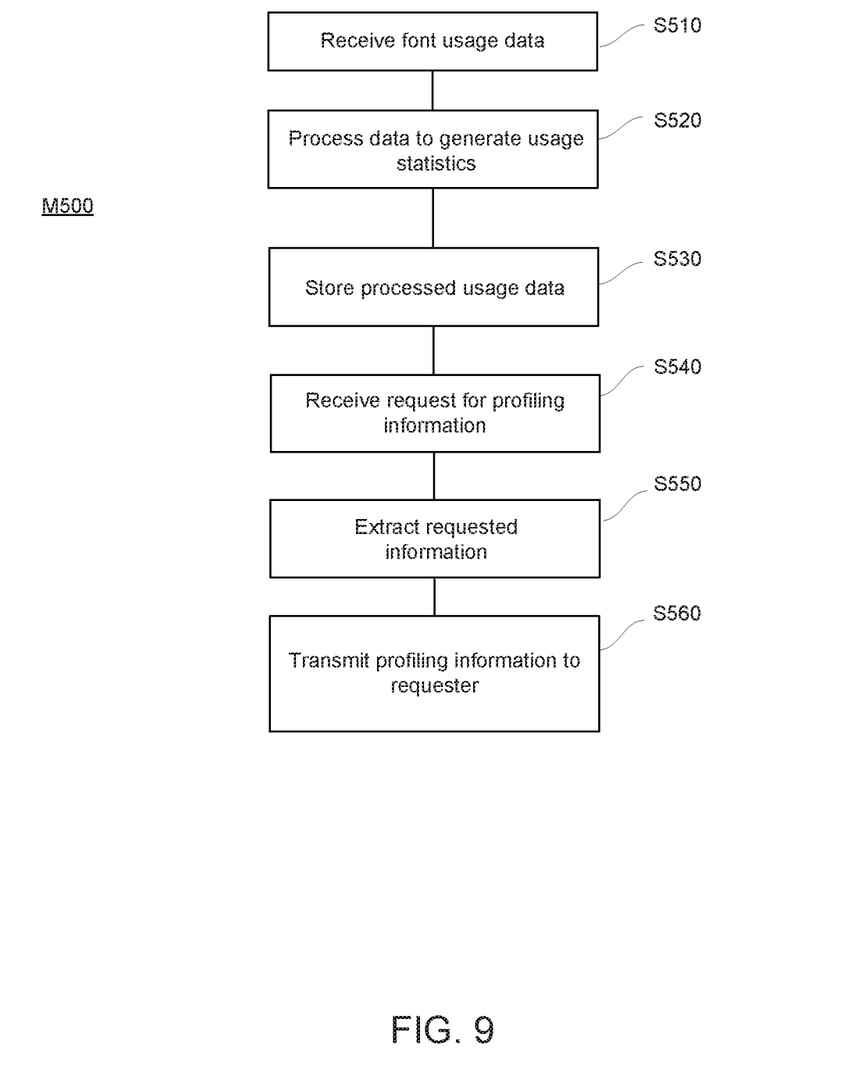
FIG. 9 is a flow diagram illustrating a method of monitoring web-based display operations according to an embodiment of the invention.

As has been discussed, service provider may collect font usage data from many client devices, aggregate the data, and provide usage profile information back to subscribing devices. FIG. 9 illustrates an exemplary method M500 of monitoring font usage in web-based display operations to assist in securing client device browsers against font usage and display characteristics profiling. At S510 of the method M500, a font usage aggregation server of the service provider receives font usage data from a plurality of client devices. The font usage data received from a client device may include information gleaned from individual interactions between the client device and a single content server, statistical information gleaned from multiple interactions with a single content server, or statistical information gleaned from interactions with multiple content servers. In all these cases, the data may include information on display instructions transmitted to the client device by the content server or servers. For individual interactions, the information may include identification of the content server, its associated content provider, or a network address. The information may also include identification of one or more character display fonts requested by the content server during the interaction. The information may also include identification of specific actions requested by the content server. In embodiments where the font usage data is provided for multiple interactions or for interactions with multiple content servers, the data may include statistical information such as the frequency of use of all fonts used to render text for display or the frequency with which a particular server or all servers render hidden text.

At S520, the font usage aggregation server may process the font usage data to obtain usage statistics across all client devices providing data. At S530, the processed font usage data may be assembled into a structured database and stored in a data storage module. At S540, the font aggregation server receives a request for profiling information. The request may specify that the profiling information include overall font usage statistics (e.g., frequency of use for one, some or all fonts) or font usage statistics and/or other information for a particular content server. At S550, the font usage aggregation server may extract the requested information from the structured database. In some embodiments, the server may further process the data to tailor it to the request. At S560, the server transmits the profiling information to the requesting client device. In some embodiments, the server may periodically transmit font usage profile information to one or more client devices without receiving a request.

The methods and systems of the present invention provide a significant improvement in security and system efficiency while protecting client computing devices from browser use tracking and other intrusive and/or malicious actions. The methods of the invention provide for enhanced privacy and security by automatically changing the fingerprint of a hardware/system combination without the need for manual intervention by a user. Further, the methods of the invention provide for the use of information from other systems to implement changes to thwart system profiling.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A system for securing a web browser, the system comprising:
   a client computing device comprising a data processor, a data storage module, and a display, the data processor being programmed to perform operations comprising:
      receiving, from a content server by a web browser operating on the client computing device, a set of display instructions to display web content on the display of the client computing device;
      creating a display object using the set of display instructions;
      reviewing the display object by the web browser to determine whether one or more instructions of the set of display instructions meet font profiling criteria;
      responsive to a determination that font profiling criteria are met, altering the display object by the web browser to change a display of one or more font characters requested in the set of display instructions; and
      executing the altered display object,
   wherein the font profiling criteria include at least two of the set consisting of
      identification of an instruction to display one or more font characters in a manner that is not visible to a user of the client computing device,
      identification of an instruction to transmit back to the server dimensional information for the displayed one or more font characters,
      identification of an instruction to use a font that has a browser use frequency less than a minimum use frequency, and
      identification of instructions to use a number of fonts in excess of a predetermined font usage limit.

2. A system according to claim 1 wherein
   the action of reviewing the display object includes identification of an instruction to display one or more font characters in a manner that is not visible to a user of the client computing device, and
   the action of altering the display object includes changing characteristics of the one or more font characters without rendering them visible to the user when displayed on the client computing device.

3. A system according to claim 1 wherein
   the action of reviewing the display object includes identification of an instruction to transmit back to the server dimensional information for the displayed one or more font characters, and
   the action of altering the display object includes changing a display size of the one or more font characters.

4. A system according to claim 1 wherein the action of altering the display object includes changing a font of the one or more font characters.

5. A system according to claim 4 wherein the action of changing a font of the one or more characters includes
   identifying a specified font for at least one of the one or more font characters;
   selecting an exchange font from a list of fonts available to the browser; and
   replacing the specified font with the exchange font.

6. A system according to claim 1 further comprising:
   determining that the font profiling criteria are no longer being met; and
   reversing the change to the one or more font characters requested in the set of display instructions.

7. A system according to claim 1 wherein
   the action of reviewing the display object includes identification of an instruction to use a font that has a browser use frequency less than a minimum use frequency, and
   the action of altering the display object includes changing the instruction to use a different font that has a browser use frequency greater than the minimum use frequency.

8. A system according to claim 1 wherein the data processor is further programmed to, responsive to a determination that font profiling criteria are met, transmit profiting transaction information to a second profiling information server, the profiling transaction information including identification of the content server and the one or more instructions meeting the font profiling criteria.

9. A method for securing a web browser, the method comprising:
   receiving display instructions for displaying web content from a content server by a web browser operating on a client computing device;
   creating, by the web browser, a document object using the display instructions;
   determining, by the web browser from the document object, whether one or more of the display instructions meet font profiling criteria selected to identify attempts to profile font display characteristics of the web browser;
   responsive to a determination that font profiling criteria are met, altering, by the web browser, a character display of the document object; and
   implementing the document object for displaying the web content on the client computing device
   wherein the font profiling criteria include at least two of the set consisting of
      identification of an instruction to display one or more font characters in a manner that is not visible to a user of the client computing device,
      identification of an instruction to transmit back to the server dimensional information for the displayed one or more font characters,
      identification of an instruction to use a font that has a browser use frequency less than a minimum use frequency, and
      identification of instructions to use a number of fonts in excess of a predetermined font usage limit.

10. A method according to claim 9 wherein
    the action of reviewing the display object includes identification of instructions to use a number of fonts in excess of a predetermined limit, and
    the action of altering a character display of the document object includes changing the instructions to use a number of fonts less than the predetermined limit.

11. A method according to claim 9 wherein
    the action of reviewing the display object includes identification of an instruction for the browser to display one or more font characters in a manner that is not visible to a user of the client computing device, and the action of altering a character display of the document object includes changing characteristics of the one or more font characters without rendering them visible to the user when displayed on the client computing device.

12. A method according to claim 11 wherein the action of altering the character display includes replacing the one or more font characters with replacement characters.

13. A method according to claim 11 wherein the action of altering the character display includes changing a display size of the one or more characters.

14. A method according to claim 11 wherein the action of altering the character display includes changing a font of the one or more characters.

15. A method according to claim 14 wherein the action of changing a font of the one or more characters includes
identifying a specified font for at least one of the one or more characters;
selecting an exchange font from a list of fonts available to the browser; and
modifying the character display instruction to replace the specified font with the exchange font.

16. A non-transitory computer-readable medium containing instructions that, when executed by a data processor, cause the data processor to perform operations comprising:
receiving display instructions for displaying web content from a content server;
creating a document object using the display instructions;
determining, from the document object, whether one or more of the display instructions meet font profiling criteria selected to identify attempts to profile font display characteristics;
responsive to a determination that font profiling criteria are met, altering a character display of the document object; and
implementing the document object for displaying the web content,
wherein the font profiling criteria include at least two of the set consisting of
identification of an instruction to display one or more font characters in a manner that is not visible to a user,
identification of an instruction to transmit back to the server dimensional information for the displayed one or more font characters,
identification of an instruction to use a font that has a browser use frequency less than a minimum use frequency, and
identification of instructions to use a number of fonts in excess of a predetermined font usage limit.

17. A non-transitory computer-readable medium of claim 16, the operations further comprising
gathering font usage data during one or more browsing sessions; and
modifying the font profiling criteria based on the font usage data.

18. A non-transitory computer-readable medium of claim 16, the operations further comprising
receiving font usage data from a font usage data aggregation server; and
modifying the font profiling criteria based on the font usage data.

19. A non-transitory computer-readable medium of claim 16, the operations further comprising
identifying a network address exhibiting known fingerprinting behavior across multiple client devices; and
altering the font profiling criteria based on the identification of the network address.

20. A non-transitory computer-readable medium of claim 16, the operations further comprising
identifying a content provider exhibiting known fingerprinting behavior across multiple client devices; and
altering the font profiling criteria based on the identification of the content provider.

* * * * *